(12) United States Patent
Paul et al.

(10) Patent No.: US 7,638,154 B2
(45) Date of Patent: Dec. 29, 2009

(54) PAN SPRAY FORMULATION AND DELIVERY SYSTEM

(75) Inventors: Leonard Paul, Bloomfield, CT (US); Paul Friedman, Germantown, TN (US)

(73) Assignee: HAP International, Inc., Bloomfield, CT (US)

( * ) Notice: Subject to any disclaimer, the term of this patent is extended or adjusted under 35 U.S.C. 154(b) by 654 days.

(21) Appl. No.: 11/317,491

(22) Filed: Dec. 22, 2005

(65) Prior Publication Data

US 2006/0099320 A1  May 11, 2006

Related U.S. Application Data

(63) Continuation-in-part of application No. 10/817,576, filed on Apr. 2, 2004, now abandoned, which is a continuation-in-part of application No. 10/333,573, filed on Jan. 21, 2003, now Pat. No. 6,749,874.

(51) Int. Cl.
*A23D 7/005* (2006.01)

(52) U.S. Cl. .................................. 426/609; 426/811

(58) Field of Classification Search ............... 426/609, 426/115, 116
See application file for complete search history.

(56) References Cited

U.S. PATENT DOCUMENTS

| 4,560,569 | A | * | 12/1985 | Ivers ........................... 426/549 |
| 4,961,951 | A | * | 10/1990 | Crosby ........................ 426/602 |
| 5,455,055 | A | * | 10/1995 | Stoltz .......................... 426/115 |
| 5,552,163 | A | * | 9/1996 | Hartman et al. ................ 426/3 |
| 5,650,185 | A | * | 7/1997 | Stoltz .......................... 426/115 |
| 6,123,977 | A | * | 9/2000 | Diamond ..................... 426/601 |
| 6,749,874 | B2 | * | 6/2004 | Paul et al. .................... 426/115 |
| 2004/0191373 | A1 | * | 9/2004 | Paul et al. .................... 426/115 |

OTHER PUBLICATIONS

Anon. 1996. Food Ingredient News vol. 3, n 5. Lecithin Powder Breaks Through HLB Threshold, May 1, 1996.*

* cited by examiner

*Primary Examiner*—Carolyn A Paden
(74) *Attorney, Agent, or Firm*—Melvin I. Stoltz

(57) ABSTRACT

By combining lecithin and oil as the principal ingredients, a highly effective, uniform, widely dispersed, pan release spray product is achieved with the lecithin comprising a de-oiled powdered lecithin. The liquid lecithin and/or combinations thereof is blended with the vegetable oil, water and/or alcohol to form a stable emulsion that exhibits superior pan release properties. Furthermore, the lecithin emulsions of the present invention are easily formulated with a variety of blending agents to make flavorful salad dressings, marinades, and pet flavor enhancing products, as a non-aerosol, finger pump based product or as an aerosol product.

3 Claims, No Drawings

PAN SPRAY FORMULATION AND DELIVERY SYSTEM

RELATED APPLICATIONS

This application is a continuation-in-part of U.S. patent application Ser. No. 10/817,576, filed Apr. 2, 2004 now abandoned entitled PAN SPRAY FORMULATION AND DELIVERY SYSTEM which is a continuation-in-part of U.S. patent application Ser. No. 10/333,573, filed Jan. 21, 2003 entitled PAN SPRAY FORMULATION AND DELIVERY SYSTEM, now U.S. Pat. No. 6,749,874, issued Jun. 15, 2004, which is related to U.S. Provisional Patent Application Ser. No. 60/225,461, filed Aug. 15, 2000 entitled PAN SPRAY FORMULATION AND DELIVERY SYSTEM

TECHNICAL FIELD

This invention relates to uniform spray dispersion products and systems for oil based products, and more particularly, to dispersion systems for obtaining a wide, uniform spray of oil based products for food-related use.

BACKGROUND ART

During the last several years, substantial attention has been paid to food related products in general, and the cooking industry in particular. In this regard, substantial attention has been devoted to products used to coat surfaces of cooking utensils, such as for baking, frying, sauteing, etc. In this regard, substantial attention has been paid in an attempt to develop a product capable of meeting consumer demand for a healthy, low calorie product which is also capable of providing wide, uniformly dispersed spray coating on the surface being employed.

Typically, the surface of the cooking pot, pan, utensil, grill, etc. is manually coated with a release agent or sprayed with a release agent contained in a squeeze bottle, low pressure finger actuated pump, or aerosol container. However, the use of these prior art products typically results in the release agent being dispensed in discontinuous, non-uniform "spits" of product, or in dribbles of product. As s result, a raw, uneven spray pattern is typically achieved, which has caused these products to be commercially unacceptable.

In addition, the formulations of these pan release sprays often incorporate ingredients which health oriented consumers wish to avoid. Consequently, many of these release products are not employed by such consumers due to their perceived deleterious health effects.

One product which has successfully overcome many of the major objections found in the prior art is taught in Stoltz U.S. Pat. Nos. 5,455,055 and 5,650,185. In the disclosure found in these patents, a non-aqueous, vegetable oil, liquid lecithin and ethanol composition is taught which is dispensed from a unique non-aerosol type container, achieving a cooking spray with substantially enhanced release properties as well as spray characteristics. However, in spite of the commercial success of this product in its ability to overcome many of the prior art difficulties, the caloric level of this product has not satisfied all health conscious individuals.

In the formulation employed in these prior art patents, as well as in numerous other prior art disclosures, lecithin is employed as a principal ingredient. The use of lecithin is well known and widely employed in a variety of products for varying purposes. Lecithin which occurs in just about all living cells is a natural phospholipid. Lecithin has been used for years as a lipophilic (fat or oil loving) emulsifying agent. In the trade lecithin is classified as an oil in water (O/W) emulsifier. The role of lecithin has changed in recent years due to many chemical modifications to become more useful to industry as dispersion and wetting agents, and lubricants, as well as their enate emulsifying properties. The source for commercial lecithin in its may forms is the soybean.

Lecithin is a complex mixture of insoluble phospholipids consisting of phosphatidycholine (PC), phosphatidylethanolamine (PE), phosphatidylinositol (PI), and phosphatidic acid (PA) combined with other triglycerides. Whereas, the fluid or liquid lecithins contain almost 40% triglycerides, new de-oiled, powder lecithins has been developed which contain an average of only 3% triglycerides. With the triglycerides or oily portion of lecithin removed, the percentage of glycolipids, PC, PE, PI and PA have increased in the de-oiled powder lecithin to render them water dispersible.

Historically, lecithins were predominately thick liquids having an amber to dark brown color. Liquid lecithin is not soluble or even dispersible in water. However, lecithins have undergone considerable chemical changes to be now commercially available as a dry, free-flowing powder and above all to be easily dispersed in water.

Lecithin has become a common chemical commodity that has been used in different industries as an emulsifying agent, for example. Lecithin is used in baked goods, sauces, marinades, instant drink mixes, snack foods, chewing gum and as a cooking spray pan release agent. Lecithin is used in a variety of personal products such as skin lotions, lipstick or even health foods for its choline amino acid content. In the present invention, lecithins surface active properties acts as a highly effective pan release agent.

In spite of the extensive use that has been made of lecithin in numerous prior art products, no pan release formulation has been developed which is capable of satisfying all of the consumer demands for a universally acceptable pan release spray product and delivery system. However, the present invention has been capable of meeting this demand and long felt need.

DETAILED DISCLOSURE

By employing the present invention, all of the prior art difficulties and drawbacks have been overcome, and a pan release spray formulation and delivery system has been realized which is capable of providing a wide, uniform, dispersed spray pattern using a formulation which substantially reduces the caloric level of the composition. In attaining this composition and formulation, a unique combination of ingredients has been developed.

In accordance with one embodiment of the present invention, a highly effective, uniform, widely dispersed, pan release spray product is achieved by combining water, lecithin, and oil as the three principal ingredients. Preferably, between about 30% and 60% by weight based upon the weight of the entire composition comprises water, while between about 40% and 60% by weight based upon the weight of the entire composition comprises oil. Completing the formulation is lecithin, which comprises between about 2% and 12% by weight based upon the weight of the entire composition.

Although the combination of these quantities of water and oil is typically avoided in most formulation, due to the inability of oil and water to be intermixed with each other, in the present invention, it has been discovered that the oil and water combination along with the lecithin produces a substantially uniform stable emulsion. In the composition of this embodiment of the present invention, all of the ingredients remain fully dispersed with each other, even after long periods of storage. Consequently, in spite of the contrary teaching found in the prior art, the present invention has found that this combination of ingredients produces a unique formulation, capable of achieving results previously believed to be unattainable.

One of the principal ingredients incorporated into the pan release formulation of the present invention is a newly developed, de-oiled, powdered lecithin. As detailed herein, the de-oiled, powdered lecithin is water miscible and, in accordance with this invention, is blended with relatively high percentages of water and vegetable oil to form an oil in water stable emulsion that exhibits superior pan release properties, as compared to the liquid lecithin type product.

The oil in water emulsion of the present invention is also easily formulated with a variety of blending agents to make flavorful salad dressings, marinades, and pet flavor enhancing products, as a non-aerosol, finger pump based product or as an aerosol product. Furthermore, the use of relatively high concentrations of water in these new no-stick cooking sprays, substantially reduces the caloric levels, as compared to oil-based, non-aqueous products. In this way, a principal requirement of the consuming public is satisfied.

One important characteristic of the new, de-oiled, powered lecithin is its HLB (Hydrophilic to Lipophilic Balance) value. The HLB value or scale was developed many years ago to measure the relative solubility of surface active agents in water and oil. The HLB scale ranges from 0-15 indicating oil solubility at the lower end and water solubility at the high end of the scale.

The HLB value for liquid lecithin is 4.0 (Lipophilic), while the new, de-oiled powder lecithins range from 8.0 to 10.0 (more hydrophilic). At this level, these lecithins can be classified as water dispersible. The HLB value of dry lecithin now allows one to utilize a large percentage of water, that was not possible with the other liquid lecithin, together with vegetable oil and other blending agents to form a stable oil in water emulsion.

From an economic standpoint, the use of water, vegetable oil and dry lecithin plus the necessary blending agents insures a lower manufacturing cost over the non-aqueous oil based products. In these formulations using dry lecithin allows us to replace a good portion of a vegetable oil, such as canola, soybean, corn, olive, peanut, safflower, etc., with de-ionized water that results in a lower manufacturing cost.

There are several dry, powder lecithins to chose from depending upon its chemical properties useful to the end product produced. These dry lecithin products are produced by Central Soya Company, Ft. Wayne, Ind., and marketed as Precept™ Lecithins. Central Soya produces dry hydroxlated lecithins as Precept # 8120 that has a HLB value of 10.0. Precept # 8120 has good emulsion stability and is the most hydrophilic of the powder lecithins. Dry enzyme modified lecithin treated with phospholipase enzyme, gives Precept # 8160 a HLB value of 9.0 and good water dispersibility. Another Precept lecithin is # 8140 with a HLB value of 8.0, which resists darkening upon heating, has a faint bland taste, and is preferred for use as a pan release and/or cooking spray products. Although Precept # 8140 is preferred, all of the Precept products may be employed in pan released and/or cooking spray products.

Typical pan release products found in the prior art contains 2.0 to 8.0% liquid lecithin in a vegetable oil base. For optimum use, we have found that 2.8 to 3.0% liquid lecithin in either an aerosol or non-aerosol formulation is an acceptable pan release agent as detailed in the Stoltz patents described above. In the present invention, cooking spray with pan release properties, using a combination of a vegetable oil in a water base, generally requires from 2.0% to 12% by weight based upon the weight of the entire composition of dry powder lecithin, with a preferred range being between about 3.0% and 9.0% by weight based upon the weight of the entire composition. As shown below in the following examples, wherein formulations for both pressurized aerosol and non-aerosol pump type pan release sprays are fully detailed, a range of between 4.0% and 8.0% by weight based upon the weight of the entire composition of dry lecithin is optional for providing superior pan release properties over the conventional liquid lecithin based products.

To illustrate our surprising pan release results, the following aerosol and non-aerosol formulations are provided:

EXAMPLE 1

Pressurized Aerosol Type

| Ingredients | %/Wgt. |
|---|---|
| Concentrate: | |
| De-ionized Water | 40.0 |
| Powdered Soy Lecithin* | 6.0 |
| Canola Oil (Or other oil) | 53.4 |
| Potassium Sorbate, USP/NF** | 0.3 |
| Sodium Benzoate, USP/NF** | 0.2 |
| Vitamin E*** | 0.1 |
| Total: | 100.0 |
| Aerosol Fill: | |
| Concentrate | 85.00 |
| Propellant**** | 15.00 |
| Total: | 100.00 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry The pressurized no stick or pan release cooking spray in Example #1 deposited a white foam over the pan surface. We found that as the cooking progressed that the foam dissipated quickly. However, the pan release properties remained for the duration of the cooking cycle.

EXAMPLE #2

High Pressure Finger Pump

| Ingredient | %/Wgt. |
| --- | --- |
| De-ionized Water | 53.4 |
| Powdered Soy Lecithin* | 6.0 |
| Vegetable Oil | 40.0 |
| Potassium Sorbate, USP/NF** | 0.3 |
| Sodium Benzoate, USP/NF** | 0.2 |
| Vitamin E*** | 0.1 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry In the formulation defined as Example #2 a high pressure, finger actuated pump was used which resulted in excellent pan release properties. The presence of the white foamy particles was not a distracting factor. We found that when grilling steaks, that the meat slid easily over the treated metal grill with no sticking, even after turning the meat over several times.

The true essence of this invention concerns the dual nature of the concentrate due to its main or active ingredient, namely powdered and de-oiled soy lecithin. We have been surprised, that this invention based on the formulations shown here with high levels of water, could be made as both a pressurized aerosol and also a pump actuated non-aerosol product.

We consistently made good, highly acceptable no stick aerosol cooking sprays with the powdered lecithin ranging between about 2.0% and 12.0% by weight based upon the weight of the entire composition. The fact that the aerosol generated spray products resulted in a white, frothy deposit on the cooking surface did not detract from its pan release properties. In fact, we employed the frothy deposit as an indicator of the spray product coverage over the cooking surface. We found that a quick burst of the white emulsion was all that was required for excellent non stick properties.

On the other hand, the non-aerosol product reacted in a different manner. We found that with the lower percentages of 2.0%, 3.0% and even 4.0% powdered lecithin, that the spray pattern resulted in a "donut" effect, or a spray pattern which resembled the letter "O". The spray product ringed the circumference of the pan, however there was little or no product in the middle. From a commercial viewpoint, the "O" spray pattern is not acceptable. A good spray must provide a concentrated, evenly dispersed pattern in a concentric ring. However, to our great surprise, we discovered that the non-aerosol spray pattern filled in as the percentage of powdered lecithin was increased.

EXAMPLE #3

Pressurized Aerosol Type

| Ingredients | %/Wgt. |
| --- | --- |
| Concentrate: | |
| De-ionized Water | 30.0 |
| Powdered Lecithin* | 4.0 |
| Corn Oil | 65.4 |
| Potassium Sorbate, USP/NF** | 0.3 |
| Sodium Benzoate, USP/NF** | 0.2 |
| Vitamin E*** | 0.1 |
| Total: | 100.0 |
| Aerosol Fill: | |
| Concentrate | 83.0 |
| Propellant**** | 17.0 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry Example #3 with only 4% powdered lecithin was found to be an acceptable commercial product. The moderate amount of white coating resulted in excellent pan release properties. The cooked foods tested ranged from eggs, meat and fish. There was no odor or residue adhering to the cooked foods.

EXAMPLE #4

High Pressure Finger Pump

| Ingredients | %/Wgt. |
| --- | --- |
| De-ionized Water | 49.4 |
| Powdered Soy Lecithin* | 10.0 |
| Vegetable Oil | 40.0 |
| Potassium Sorbate, USP/NF** | 0.3 |
| Sodium Benzoate, USP/NF** | 0.2 |
| Vitamin E*** | 0.1 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry In Example 4, we employed a relatively high percentage of powered lecithin combined with water and oil. In this formulation, we found that while the oil in water emulsion is thick the product sprays well and especially fills in the spray pattern with widely dispersed particles. In general, non-aerosol formulations with powdered lecithin over 6.0% produced similar spray patterns. This formulation resulted in the same excellent no stick properties as the other formulations shown above.

In this disclosure, we commonly describe the products as "No Stick Cooking Spray" or "Pan Release Cooking Spray". Both of these terms are used interchangeable, referring to the same type product.

We have noted above that the non-aerosol pump type formulations resulted in a donut or "O" spray pattern. This effect was eliminated with increased percentages of the powdered lecithin. However, this can be a concern for commercial products since the cost of the powdered lecithin is a big factor. However, we also discovered, to our great surprise, that the method of incorporating or compounding the product had a direct relationship to the resulting spray pattern.

We found that if the powdered lecithin was first mixed into the oil and then the water, the spray patterns tended to end up as empty circles. However, if the powdered lecithin was first mixed into the water and then the oil, the resulting sprays patterns tended to be more evenly dispersed. For this important reason, and not to mislead users of the information included here, we always list the ingredients in the preferred order of addition.

Since the order of ingredient incorporation is important for both aerosol and non-aerosol type products, we describe the batch compounding process as follows:

1. Add the de-ionized, preferably UV treated, water to a stainless steel, sanitized, scale mounted batch tank equipped with serrated shearing mixing blades.
2. When the water is well above the serrated mixing blades, start the mixer at a moderate speed. Avoid any splashing or aeration.
3. Slowly sift in the required amount of powdered lecithin making sure there are no clumps. We found that the powdered lecithin requires all clumps to be broken down to a smooth, uniform powder. This is especially true since powdered lecithin is very hygroscopic and really picks up moisture from the atmosphere, thereby forming clumps.
4. Once all the de-ionized water and powdered lecithin are in the batch tank, the mixing speed is increased to break up any clumps and wet the powder as it combines with the water. The batch at this time is being mixed until all the powdered lecithin is finely dispersed in the water phase and no particles or clumps are visible.
5. The oil is now added slowly that produces a creamy, smooth emulsion. At this point, with the shearing action of the mixer, we find that the powdered lecithin goes into a colloidal emulsified stable state, more readily than in the dispersed initial water phase. The time and effort to batch in the manner shown above, proves beneficial at a later stage when the final product has to be sprayed.
6. The three final ingredients are added in order to complete the batched product.

In a second, alternate embodiment of the present invention, it has been found that a highly effective, uniform, widely dispersed, pan spray release product is achieved by combining lecithin and oil as the principal ingredients. In this unique formulation, it has been found that the use of both water and/or alcohol are eliminated, and a highly effective pan release spray product is attained.

In the preferred formulation of this embodiment of the present invention, it has been found that lecithin should comprises between about 0.5% and 10% by weight based upon the weight of the entire composition, while the balance of the formulation comprises oil. In this regard, any desired food oil can be employed, with the food oil preferably comprising one or more vegetable oils. Although the vegetable oil incorporated into the formulation of the present invention can be selected from a wide variety of alternate vegetable oils, it has been found that the vegetable oil employed in this composition preferable comprises one more selected from the group consisting of canola oil, soybean oil, corn oil, olive oil, peanut oil, safflower oil, and grape seed oil.

In addition, as detailed above, this embodiment of the present invention also preferably employs de-oiled, powdered lecithin in formulating the desired pan release spray product. By combining de-oiled, powdered lecithin with one or more food oils, preferably vegetable oils, it has been found that compositions are realized which exhibit superior pan release properties.

In regard to the particular de-oiled, powdered lecithin product employed in this embodiment of the present invention, the detailed disclosure provided above in regard to the preferred manufacturers of dry, powdered lecithin has been found to be equally applicable to this embodiment of the present invention. Consequently, the foregoing disclosure detailing various manufacturers of preferred dry lecithin products is incorporated herein by reference, with that disclosure having equal applicability to this embodiment of the present invention.

In addition, this embodiment of the present invention may also incorporate any desired additives and/or blending agents. Typically, these additives and/or blending agents comprise one or more selected from the group consisting of preservatives, antioxidants, vitamins, anti-fungal compositions, antibacterial compositions, and flavorings. Furthermore, as detailed above, this embodiment of the present invention may also be formulated and packaged for being dispensed from a finger actuated, pump container or a pressurized, aerosol container.

In Example 5, the preferred formulation ranges for the pan release spray product of this embodiment of the present invention are fully detailed. In addition, further formulation examples of the present invention are shown below in Examples 6-8, with each of these formulations being dispensable from either a pressurized, aerosol container or a finger actuated, pump container. As is evident from this disclosure, a wide variety of alternate formulations and ingredient ranges can be implemented in accordance with the teaching of the present invention, without deviating from the overall scope of this invention.

EXAMPLE 5

| Ingredient | % by Weight |
| --- | --- |
| Dry Lecithin | 0.5-10 |
| Oil | 90-99.5 |

EXAMPLE 6

| Ingredient | % by Weight |
| --- | --- |
| Dry Lecithin | 0.5-5 |
| Additives | 0.1-2 |
| Oil | q.s. to 100% |

EXAMPLE 7

| Ingredient | % by Weight |
| --- | --- |
| Dry Lecithin | 2% |
| Additives | 0.1-2% |
| Vegetable Oil | q.s. to 100% |

EXAMPLE 8

| Ingredient | % by Weight |
| --- | --- |
| Dry Lecithin | 0.5-1% |
| Grape Seed Oil | 10-15% |
| Safflower Oil and/or Corn Oil and/or Canola Oil | q.s. to 100% |

In each of the foregoing examples, it is preferred that the oil employed in forming the composition comprises at least one or more vegetable oils selected from the group consisting of canola oil, soybean oil, corn oil, olive oil, peanut oil, grape seed oil, and safflower oil. In addition, the additives defined in the foregoing examples preferably comprise one or more selected from the group consisting of vitamins, flavorings, preservatives, anti-oxidants, anti-fungal compositions, and antibacterial compositions.

In formulating each of the compositions defined in the foregoing examples, it has been found that the preferred procedure comprises adding the oil to a stainless steel, sanitized, scale mounted batch tank equipped with mixing blades, followed by heating the oil to between about 120° F. and 150° F. Once the oil has reached the desired temperature, the dry lecithin and the desired additives are slowly sifted into the hot oil. Care should be exercised to be certain that the lecithin and additives are broken down to a smooth, uniform powder, devoid of any clumps.

Once all the ingredients have been added to the oil, the composition is thoroughly mixed until the dry lecithin and the desired additives are fully disbursed in the oil. Once full mixing has been achieved, the composition is allowed to cool and then the desired containers are filled.

In order to employ the formulations of this embodiment of the present invention, the desired formulation is prepared, as detailed above, and then placed in a suitable container for dispensing that the highly effective, pan release spray product. In this regard, in one instance, the formulation is placed in a container on which a finger actuated, pump spray head is mounted for enabling the pan release spray product to be quickly and easily dispensed from the container by merely actuating the pump spray head.

Typically, either a high pressure, finger actuated pump spray head is employed or a lever operated trigger spray head is employed. Regardless of which spray head is use, the present invention has been found to quickly and easily dispense the product from the container in a uniform, widely disbursed, full spray pattern.

Alternatively, if desired, the pan release spray product is placed in a container in which any desired propellant is employed for dispensing the pan release spray product as an aerosol. In this regard, a suitable nozzle is mounted to the container for enabling the pan release spray product to be dispensed in the desired, uniform, widely disbursed spray pattern for assuring ease of use.

We have also discovered that both embodiments of the non-aerosol, pan release, spray formulations of the present invention detailed above can be distributed in reusable or refillable containers, thereby further enhancing the cost savings properties of the present invention. In this regard, the high pressure finger pump employed to dispense the pan release product of the present invention may be mounted to a container having a threaded collar, thereby allowing the finger actuated pump to be threadedly mounted to the product holding container.

As a result, whenever the product has been consumed, the pump is merely removed from the container and the container is refilled from a newly purchased product only holding container. In this way, a consumer is able to purchase the non-aerosol, pan release, spray formulation of this invention in a container which does not include the expensive high pressure, finger actuated pump attached thereto. As a result, a substantially reduced cost would be incurred when purchasing only the product formulation, and a substantial savings benefits would result to the consumer.

In addition, we have also found that the non-aerosol, pan release spray formulations of the present invention may also be employed by merely pouring the product directly into a pan for use. As a result, a refillable, threaded container can provide a dual function. In this regard, the finger actuated pump attached to a threaded container can be employed by spraying the product onto the pan or, if desired, the pump can be removed from the container and the pan release product poured into the skillet. In this way, the consumer is able to enjoy complete control over the precise manner in which the product is dispensed.

Finally, we have also discovered that the pourable pan release spray formulation of the present invention may also be employed as a salad oil base for use with any desired flavorings. In this regard, a desired quantity of the pan release spray product is poured into a container and then mixed with any desired salad dressing mix or flavorings. In this way, a highly desirable salad dressing is realized.

Furthermore, if desired, a specially created salad dressing mixing composition can be formulated, with the composition incorporating vinegar for further enhancing the taste of any resulting salad dressing. However, as detailed above, the pan release product itself can be employed, with vinegar being added, if desired, along with the suitable salad dressing flavorings.

In a third, alternate embodiment of the present invention, it has been found that a highly effective pan spray release product is achieved by combining liquid lecithin with de-oiled, powdered lecithin as the principal ingredients along with oil. In this unique formulation, both water and alcohol are eliminated and a highly effective, pan release spray product is attained.

In the preferred formulation of this embodiment of the present invention, it has been found that the liquid lecithin and de-oiled, powdered lecithin combination should comprise between about 1% and 12% by weight based on the weight of the entire composition. The balance of the composition comprises the oil.

In creating the combination of de-oiled, powdered lecithin and liquid lecithin for incorporation into the pan spray formulation of this invention, virtually any desired ratio of these ingredients can be effectively employed. However, in the preferred formulation, at least 1% by weight, based upon the weight of the entire composition, of liquid lecithin is employed, with a maximum quantity being no greater than 8% by weight. In addition, the quantity of de-oiled, powdered lecithin incorporated into the pan spray formulation of this embodiment of the present invention ranges between about 2% and 10% by weight, based upon the weight of the entire composition.

In regard to the particular de-oiled, powdered lecithin product employed in this embodiment of the present invention, the detailed disclosure provided above in regard to the preferred manufacturers of dry, powdered lecithin has been found to be equally applicable to this embodiment of the present invention. Consequently, the foregoing disclosure detailing various manufacturers of preferred dry lecithin products is incorporated herein by reference, with that disclosure having equal applicability to this embodiment of the present invention.

In regard to the oil incorporated into the pan spray release product of this embodiment of the present invention, any desired food oil can be employed, as detailed above. Preferably, the food oil comprises one or more vegetable oils. Although the vegetable oil incorporated into this formulation of the present invention can be selected from a wide a variety of alternate vegetable oils, it has been found that the vegetable oil preferably employed in this composition comprises one or more selected from the group consisting of canola oil, soybean oil, corn oil, olive oil, peanut oil, safflower oil, and grape seed oil.

Furthermore, this embodiment of the present invention may also incorporate any desired additives and/or blending agents. Typically these additives and/or blending agents comprise one or more selected from the group consisting of preservatives, antioxidants, vitamins, anti-fungal compositions, antibacterial compositions, and flavorings. In addition, as detailed above, this embodiment of the present invention may also be formulated and packaged for being dispensed from a finger actuated pump container or from a pressurized, aerosol container.

In Example 9, the preferred formulation ranges for this embodiment of the pan release spray product are fully detailed. In addition, further formulation examples of this embodiment of the present invention are shown below in Examples 10-11, with each of these formulations being dispensable from either a pressurized, aerosol container or a finger actuated, pump container. As is evident from this disclosure, a wide variety of alternate formulations and ingredient ranges can be implemented in accordance with the teaching of the present invention, without deviating from the overall scope of this invention.

EXAMPLE 9

| Ingredient | % by Weight |
| --- | --- |
| Combination of liquid lecithin and dry lecithin | 1.0-6.0 |
| Oil | 94-99 |

EXAMPLE 10

| Ingredient | % by Weight |
| --- | --- |
| Liquid lecithin | 1-4 |
| Dry lecithin | 2-5 |
| Oil | q.s. to 100 |

EXAMPLE 11

| Ingredient | % by Weight |
| --- | --- |
| Liquid lecithin | 3% |
| Dry lecithin | 3% |
| Additives | 0.1-2 |
| Oil | q.s. to 100 |

In an alternate variation of this embodiment of the present invention, it has been found that a highly effective pan spray release product is achieved by incorporating ethyl alcohol along with the liquid lecithin, de-oiled, powdered lecithin, and oil, as detailed above, as the principal ingredients. In this unique alternate formulation, it has been found that the use of water is eliminated and a highly effective, pan release spray product is realized.

In the preferred formulation of this alternate embodiment of the present invention, it has also been found that the ethyl alcohol incorporated into the formulation preferably comprises between about 1% and 6% by weight based upon the weight of the entire composition.

In achieving the pan spray formulation of this alternate embodiment of the present invention, the ethyl alcohol employed preferably comprises pure grain ethyl alcohol or 200 proof ethyl alcohol. By employing this high-grade ethyl alcohol, the presence of water is substantially eliminated.

In formulating particular compositions for being dispensed in a particular dispensing vehicle, it has been found that formulations constructed for being dispensed from a pressurized, aerosol container preferably incorporate ethyl alcohol ranging between about 1% and 3% by weight based upon the weight of the entire composition. Furthermore, in formulating compositions for being dispensed from a finger actuated, pump container, the ethyl alcohol preferably comprises between about 3% and 6% by weight based upon the weight of the entire composition. By employing these parameters, it has been found that a highly effective, easily dispensed pan spray release product is realized.

In Example 12, the preferred formulation ranges for this alternate embodiment of the pan release spray product are fully detailed. In addition, further formulation examples of this embodiment of the present invention are shown in Examples 13-14. In this regard, the formulation provided in Example 13 provides a formulation which is preferred for being dispensed from a pressurized, aerosol container, while the formulation defined in Example 14 is preferred for being dispensed in a finger actuated, pump container. However, as is evident from this disclosure and the examples provided above, a wide variety of alternate formulations and ingredient ranges can be implemented in accordance with the teaching of the present invention, without deviating from the overall scope of this invention.

EXAMPLE 12

| Ingredient | % by Weight |
| --- | --- |
| Liquid lecithin and dry lecithin | 1-6 |
| Ethyl Alcohol | 1-6 |
| Oil | q.s. to 100 |

EXAMPLE 13

| Ingredient | % by Weight |
| --- | --- |
| Liquid lecithin | 2-4 |
| Dry lecithin | 2-4 |
| Ethyl Alcohol | 1-3 |
| Additives | 0.1-2 |
| Oil | q.s. to 100 |

EXAMPLE 14

| Ingredient | % by Weight |
| --- | --- |
| Liquid lecithin | 3% |
| Dry lecithin | 3% |
| Ethyl Alcohol | 3-6 |
| Additives | 0.1-2 |
| Oil | q.s. to 100 |

In a still further alternate embodiment of the present invention, it has been found that a highly effective pan spray release product is achieved by mixing oil, water, and at least one selected from the group consisting of liquid lecithin, de-oiled, powdered lecithin, and combinations thereof. In this formulation, oil and water comprises between about 60% and 94% by weight based upon the weight of the entire composition. In this unique formulation, alcohol is eliminated and a highly effective, pan release spray product is attained.

In the preferred formulation of this embodiment of the present invention, it has been found that the liquid lecithin, de-oiled, powdered lecithin, or a combination thereof should comprise between about 1% and 9% by weight based on the weight of the entire composition. As indicated above, water should comprise between about 60% and 94% by weight based upon the entire composition. Finally, the balance of the composition comprises the oil.

In creating the combination of de-oiled, powdered lecithin and liquid lecithin for incorporation into the pan spray formulation of this invention, virtually any desired ratio of these ingredients can be effectively employed. However, in the preferred formulation, at least 1% by weight, based upon the weight of the entire composition, of liquid lecithin is employed, with a maximum quantity being no greater than 4% by weight. In addition, the quantity of de-oiled, powdered lecithin incorporated into the pan spray formulation of this embodiment of the present invention ranges between about 2% and 5% by weight, based upon the weight of the entire composition.

In regard to the particular de-oiled, powdered lecithin product employed in this embodiment of the present invention, the detailed disclosure provided above in regard to the preferred manufacturers of dry, powdered lecithin has been found to be equally applicable to this embodiment of the present invention. Consequently, the foregoing disclosure detailing various manufacturers of preferred dry lecithin products is incorporated herein by reference, with that disclosure having equal applicability to this embodiment of the present invention.

In regard to the oil incorporated into the pan spray release product of this embodiment of the present invention, any desired food oil can be employed, as detailed above. Preferably, the food oil comprises one or more vegetable oils. Although the vegetable oil incorporated into this formulation of the present invention can be selected from a wide a variety of alternate vegetable oils, it has been found that the vegetable oil preferably employed in this composition comprises one or more selected from the group consisting of canola oil, soybean oil, corn oil, olive oil, peanut oil, safflower oil, and grape seed oil.

Furthermore, this embodiment of the present invention may also incorporate any desired additives and/or blending agents. Typically these additives and/or blending agents comprise one or more selected from the group consisting of preservatives, antioxidants, vitamins, anti-fungal compositions, antibacterial compositions, and flavorings. In addition, as detailed above, this embodiment of the present invention may also be formulated and packaged for being dispensed from a finger actuated pump container or from a pressurized, aerosol container.

In Example 15, the preferred formulation ranges for this embodiment of the pan release spray product are fully detailed. In addition, further formulation examples of this embodiment of the present invention are shown below in Examples 16-19, with each of these formulations being dispensable from either a pressurized, aerosol container or a finger actuated, pump container. As is evident from this disclosure, a wide variety of alternate formulations and ingredient ranges can be implemented in accordance with the teaching of the present invention, without deviating from the overall scope of this invention.

EXAMPLE 15

| Ingredient | % by Weight |
| --- | --- |
| Dry lecithin, liquid lecithin, or combination | 1-9 |
| Water | 65-90 |
| Oil | q.s. to 100% |

EXAMPLE 16

| Ingredient | % by Weight |
| --- | --- |
| Liquid lecithin | 1-5 |
| Dry lecithin | 2-5 |
| Oil | q.s. to 100 |
| Water | 65-90 |

EXAMPLE 17

| Ingredient | % by Weight |
| --- | --- |
| Liquid lecithin | 3% |
| Dry lecithin | 3% |
| Additives | 0.1-2 |
| Oil | q.s. to 100 |
| Water | 65-90 |

EXAMPLE 18

| Ingredient | % by Weight |
| --- | --- |
| Liquid lecithin | 3 |
| Dry lecithin | 3 |
| Oil | 20 |
| Water | 74 |

EXAMPLE 19

| Ingredient | % by Weight |
| --- | --- |
| Liquid lecithin | 3 |
| Dry lecithin | 3 |
| Oil | 30 |
| Water | 64 |

Although the formulations detailed above can be dispensed by employing either pump spray or aerosol spray containers, it has been found that the formulation defined in Example 18 is best dispensed using a pump spray. In addition, the formulation defined in Example 19 is best dispensed by employing an aerosol spray container. In this regard, although any desired propellant can be employed in the aerosol container, it has been found that the preferred propellant comprises one selected from the group consisting of nitrogen, butane, compressed air and carbon dioxide.

It has been found that a preferred method is employed for preparing the formulations defined in Examples 15-19. In this regard, in preparing each of these specific formulations, it is preferred to heat the water to between about 120° F. and 130° F. before adding the dry lecithin. Once the water has been heated, the dry lecithin is added to the water and thoroughly mixed therein until an emulsion is obtained. Therefore, the liquid lecithin is added to the emulsion before adding the remaining ingredients for obtaining the final product.

It has also been found that in each of these formulations incorporating large quantities of water, a preservative may be added to the formulation for improving shelf life. In this regard, it has been found that Vitamin E is preferably employed as the preservative.

In an alternate variation of this embodiment of the present invention, it has been found that a highly effective pan spray release product is achieved by incorporating ethyl alcohol along with the liquid lecithin, de-oiled, powdered lecithin, oil, and water as detailed above. In this unique alternate formulation, it has been found that a highly effective, pan release spray product is attained.

In the preferred formulation of this alternate embodiment of the present invention, it has also been found that the ethyl alcohol incorporated into the formulation preferably comprises between about 2% and 6% by weight based upon the weight of the entire composition.

In achieving the pan spray formulation of this alternate embodiment of the present invention, the ethyl alcohol employed preferably comprises pure grain ethyl alcohol or 200 proof ethyl alcohol.

In formulating particular compositions for being dispensed in a particular dispensing vehicle, it has been found that formulations constructed for being dispensed from a pressurized, aerosol container preferably incorporate ethyl alcohol ranging between about 1% and 3% by weight based upon the weight of the entire composition. Furthermore, in formulating compositions for being dispensed from a finger actuated, pump container, the ethyl alcohol preferably comprises between about 3% and 6% by weight based upon the weight of the entire composition. By employing these parameters, it has been found that a highly effective, easily dispensed pan spray release product is realized.

In Example 20, the preferred formulation ranges for this alternate embodiment of the pan release spray product are fully detailed. In addition, a further formulation example of this embodiment of the present invention is shown in Example 21. In this regard, the formulation provided in Example 21 provides a formulation which is preferred for being dispensed as a foam. However, as is evident from this disclosure and the examples provided above, a wide variety of alternate formulations and ingredient ranges can be implemented in accordance with the teaching of the present invention, without deviating from the overall scope of this invention.

EXAMPLE 20

| Ingredient | % by Weight |
| --- | --- |
| Liquid lecithin, dry lecithin and combinations | 1-9 |
| Ethyl Alcohol | 2-6 |
| Oil | 2-30 |
| Water | q.s. to 100 |

EXAMPLE 21

| Ingredient | % by Weight |
| --- | --- |
| Liquid lecithin | 2-6 |
| Dry lecithin | 2-9 |
| Ethyl Alcohol | 2-6 |
| Oil | 2-10 |
| Surfactant | 2-20 |
| Water | q.s. to 100 |

In order to obtain a foam product which is easily dispensed, used and spread, it has been found that the inclusion of a surfactant ranging between about 2% and 20% by weight, based upon the weight of the entire composition, is required. In this regard, the surfactant employed must be of a food grade, in order to be usable as a pan spray for cooking.

Although a wide variety of food grade surfactants can be employed in accordance with the teaching of the present invention, the preferred food grade surfactant employed in the composition of the present invention preferably comprises sodium lauryl sulfate. In addition, Stepanol WA-100 NF/UFP manufactured by the Stepan Company of Northfield Ill. has been found to provide optimum results.

By employing the composition defined in Example 21, a unique pan release product is realized which is dispensed from any suitable container as a foam for enabling its ease of use and spreadability. In this way, consumers are provided with a further additional composition capable of satisfying all of the consumer requirements, desires and needs.

A still further, additional, alternate embodiment of the present invention has been developed which achieves a highly effective pan release product capable of being dispensed from a squeeze bottle as a gel or other highly viscous liquid. In the preferred a formulation developed for achieving this viscous liquid or gel product, it has been found that between about 1% and 6% by weight, based upon the weight of the entire composition, of at least one selected from the group consisting of liquid lecithin, de-oiled powdered lecithin, and combinations thereof is employed. In addition, between about 30% and 60% by weight, based upon the weight of the entire composition, of water is used, with oil forming the balance. Furthermore, in order to achieve the desired gel composition or viscous liquid formulation, between about 1% and 5% by weight, based upon the weight of the entire composition, of a thickening agent is also employed. By referring to Example 22, this preferred formulation is fully detail.

EXAMPLE 22

| Ingredient | % by Weight |
| --- | --- |
| Liquid lecithin, dry lecithin and combinations | 1-6 |
| Thickening Agent | 1-5 |
| Oil | q.s. to 100 |
| Water | 30-60 |

In the preferred construction of this embodiment of the present invention, the thickening agent used to provide the gel composition or viscous liquid formulation preferably comprises at least one selected from the group consisting of wood pulp, carrageenan, guar gum and zanthum gum. In addition, in accordance with the present invention, combinations of these compounds can also be employed to form the desired thickening agent.

It has been found that by incorporating one of more of the foregoing thickening agents into the composition as a part of the formulation defined in Example 22, a uniquely constructed pan release product is realized which is easily dispensed from a squeeze bottle. By employing a container of this nature for dispensing the product, a plurality of small drops or puddles on the product is easily placed on the surface of a pan, and then easily intermingled with each other using a suitable utensil. In this way, the precise amount desired by the user can be efficiently and effectively dispensed with portion control being easily attained.

It has also been discovered that a highly effective pan spray release product is achieved by employing de-oiled, powdered lecithin and liquid lecithin in combination with alcohol and water. In this regard, it has been found that between about 2% and 7% by weight based upon the weight of the entire composition of de-oiled, powdered lecithin is employed along with between about 2% and 7% by weight based upon the weight of the entire composition of liquid lecithin. In addition, between about 3% and 8% by weight based upon the weight of the entire composition of alcohol is employed, with the balance of the formulation comprising water. In formulating this composition, all of the specific detailed above regarding these components and the particular compounds employed for these components is incorporated herein by reference, without reiterating or repeating these specific details.

By referring to Example 23, the formulation detailed above is fully disclosed, with Example 24 providing a more specific formulation coming within the scope of the formulation defined in Example 23. By referring to Example 24, a more specific formulation for this particular composition can be found.

EXAMPLE 23

| Ingredient | % by Weight |
| --- | --- |
| Dry Lecithin | 2-7 |
| Liquid Lecithin | 2-7 |
| Alcohol | 3-8 |
| Water | q.s. to 100 |

EXAMPLE 24

| Ingredient | % by Weight |
| --- | --- |
| Dry Lecithin | 6 |
| Liquid Lecithin | 5 |
| Alcohol | 5 |
| Water | q.s. to 100 |

It has also been discovered that still further additional formulations can be employed to produce a highly effective pan spray release product. In one of these additional formulations, de-oiled, dry lecithin is combined with water as the only ingredients for the composition, while an alternate formulation employs liquid lecithin in combination with dry lecithin and water. In addition, a further formulation employs liquid lecithin in combination with alcohol and water. By employing any of these formulations, it has been found that a highly effective pan spray release product is attained. By referring to Examples 25, 26, 27, 28, and 29 the preferred compositions for these formulations is fully detailed.

EXAMPLE 25

| Ingredient | % by Weight |
| --- | --- |
| Dry Lecithin | 2-5 |
| Water | q.s. to 100 |

EXAMPLE 26

| Ingredient | % by Weight |
| --- | --- |
| Dry Lecithin | 3 |
| Water | 97 |

EXAMPLE 27

| Ingredient | % by Weight |
| --- | --- |
| Dry Lecithin | 1-6 |
| Liquid Lecithin | 1-6 |
| Water | q.s. to 100 |

EXAMPLE 28

| Ingredient | % by Weight |
| --- | --- |
| Dry Lecithin | 3 |
| Liquid Lecithin | 3 |
| Water | 94 |

EXAMPLE 29

| Ingredient | % by Weight |
| --- | --- |
| Liquid Lecithin | 2-7 |
| Alcohol | 3-8 |
| Water | q.s. to 100 |

It has been found that the compositions defined above and detailed and Examples 25, 26, 27, 28 and 29 provide a highly effective pan spray which is best delivered from a container incorporating a hand operated trigger pump. Due to large quantity of water employed in each of these formulations, the resulting product comprises a viscosity which is best delivered by employing a trigger pump. However, if desired, other delivery systems or composition additives can be employed, without deviating from the present invention, in order to attain any particular benefits desired.

In addition, it has been found that a preferred method is employed or preparing the formulations defined in Examples 25, 26, 27, and 28. In this regard, in preparing each of these specific formulations, it is preferred to heat the water to between about 120° F. and 130° F. before adding the dry lecithin. Once the water has been heated, the dry lecithin is added to the water and thoroughly mixed therein until an emulsion is obtained. Thereafter, the liquid lecithin is added to the emulsion for obtaining the final product.

It has also been found that in each of these formulations incorporating large quantities of water, a preservative should be added to the formulation for improving shelf life. In this regard, it has been found that Vitamin E is preferably employed as the preservative.

In another, still further alternate embodiment of the present invention, it has been found that a highly effective pan spray release product is achieved by incorporating either propylene glycol or sorbitol along with the liquid lecithin, de-oiled, powdered lecithin, oil, and water as detailed above. In this unique, further alternate formulation, it has been found that a highly effective, pan release spray product is attained.

In the preferred formulation of this alternate embodiment of the present invention, it has also been found that the propylene glycol or sorbitol incorporated into the formulation preferably comprises between about 2% and 8% by weight based upon the weight of the entire composition, with 5% being preferred.

In Example 30, the preferred formulation ranges for this alternate embodiment of the pan release spray product are fully detailed, in addition, a further formulation example of this embodiment of the present invention is shown in Example 31. However, a wide variety of alternate formulations and ingredient ranges can be implemented in accordance with the teaching of the present invention, without departing from the overall scope of this invention.

EXAMPLE 30

| Ingredient | % by Weight |
| --- | --- |
| Liquid lecithin, dry lecithin and combinations | 1-9 |
| Proplylene Glycol or or Sorbitol | 2-8 |
| Oil | 2-30 |
| Water | q.s. to 100 |

EXAMPLE 31

| Ingredient | % by Weight |
| --- | --- |
| Liquid lecithin | 3 |
| Dry lecithin | 3 |
| Propylene Glycol or Sorbitol | 5 |
| Oil | 20 |
| Water | 69 |

It will thus be seen that the objects set forth above, among those made apparent from the proceeding description, are efficiently attained and, since certain changes may be made in carrying out the above process and in the composition set forth without departing from the scope of the invention, it intended that all matter contained in the foregoing description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Having described our invention, what we claim as new and desire to secure by Letter Patent is:

1. A pan release product comprising:
   A. between about 2% and 6% by weight based upon the weight of the entire composition of de-oiled, powdered lecithin, between about 2% and 9% by weight based upon the entire weight of the liquid lecithin, and combinations thereof;
   B. between about 2% and 6% by weight based upon the weight of the entire composition of ethyl alcohol selected from the group consisting of pure grain ethyl alcohol and 200 proof ethyl alcohol;
   C. between about 2% and 10% by weight based upon the weight of the entire composition of oil;

D. between about 2% and 20% by weight based upon the weight of the entire composition of a surfactant comprising food grade sodium lauryl sulfate; and E. water forming the balance;

whereby an effective pan release product is realized.

2. A pan release product formulated for delivery as a gel and comprising:

A. between about 1% and 6% by weight based upon the weight of the entire composition of at least one selected from the group consisting of de-oiled, powdered lecithin, liquid lecithin, and combinations thereof;

B. between about 30% and 60% by weight based upon the weight of the entire composition of water;

C. between about 1% and 5% by weight based upon the weight of the entire composition of a thickening agent, said thickening agent comprises at least one selected from the group consisting of wood pulp, carrageenan, guar gum and zanthum gum; and D. oil forming the balance.

3. The pan release product defined in claim 2, wherein the thickening agent is further defined as comprising between about 1% and 4% by weight based upon the weight of the entire composition of wood pulp and between about 0.5% and 3% by weight based upon the weight of the entire composition of carrageenan.

* * * * *